(12) United States Patent
Nishida

(10) Patent No.: US 7,180,676 B2
(45) Date of Patent: Feb. 20, 2007

(54) PROJECTOR

(75) Inventor: Kazuhiro Nishida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 58 days.

(21) Appl. No.: 11/250,569

(22) Filed: Oct. 17, 2005

(65) Prior Publication Data

US 2006/0082893 A1 Apr. 20, 2006

(30) Foreign Application Priority Data

Oct. 18, 2004 (JP) ............................. 2004-303104

(51) Int. Cl.
*G02B 3/00* (2006.01)
(52) U.S. Cl. ...................... 359/649; 359/650
(58) Field of Classification Search ........ 359/649–651; 353/102, 100, 30, 31, 20

See application file for complete search history.

(56) References Cited

U.S. PATENT DOCUMENTS 6,688,748 B2 * 2/2004 Lewis et al. .................. 353/69
6,869,186 B2 * 3/2005 Ogawa ......................... 353/31

FOREIGN PATENT DOCUMENTS

JP          A-11-160788        6/1999

* cited by examiner

Primary Examiner—Hung Xuan Dang
Assistant Examiner—Mohammed Hasan
(74) Attorney, Agent, or Firm—Oliff & Berridge, PLC

(57) ABSTRACT

A projector, includes: a light source device; an optical modulator arranged on an illumination optical axis of a light beam irradiated by the light source device to modulate the light beam in accordance with image information and form an optical image; a projection lens that enlarges the optical image formed by the optical modulator and projects the optical image; and an optical converter arranged between the optical modulator and the projection lens and provided with an optical conversion area that optically converts the incident light beam, in which the optical conversion area of the optical converter is formed in a profile on which substantially all of the light beams irradiated from the optical modulator to be irradiated from the projection lens as the optical image are incident, the optical modulator has a center axis passing though the center of an optical image formation area of the optical modulator and being parallel to the illumination optical axis, the projection lens is so arranged that a lens optical axis of the projection lens is deviated in parallel relative to the center axis of the optical modulator, and the center axis passing through the center of the optical conversion area and being parallel to the illumination optical axis is positioned within a range between: a plane orthogonal to a deviation direction of the lens optical axis of the projection lens relative to the center axis of the optical modulator and including the center axis of the optical modulator; and a plane orthogonal to the deviation direction and including the lens optical axis.

3 Claims, 7 Drawing Sheets

PROJECTOR

The entire disclosure of Japanese Patent Application No. 2004-303104, filed Oct. 18, 2004, is expressly incorporated by reference herein.

BACKGROUND

1. Technical Field

Exemplary aspects of the present invention relate to a projector having a light source device, an optical modulator arranged on an optical axis of a light beam irradiated by the light source device to modulate the light beam in accordance with image information and form an optical image, and a projection lens that enlarges the optical image formed by the optical modulator and projects the optical image.

2. Related Art

Generally, there has been used a projector for presentations at conferences, academic societies, exhibitions and the like. Such projector includes a light source, an optical modulator arranged on an illumination optical axis of a light beam irradiated by the light source to modulate the light beam in accordance with image information and form an optical image, and a projection lens that projects the optical image formed by the optical modulator in an enlarged manner.

The projector occasionally uses an optical converter that optically converts the incident light beam in order to enhance light utilization efficiency irradiated by the light source and restrict transmission of the unnecessary light beam. As an example of the optical converter, there has been known a polarization plate that only transmits a polarized light in a predetermined direction and absorbs other light beam, as well as a projector using such polarization plate (for instance, see Document 1: JP-A-11-160788, FIG. 5).

The projector disclosed in Document 1 includes three optical modulators and the polarization plate is arranged on the light irradiation side of each optical modulator. To be more specific, as shown in FIG. 7, each polarization plate 443 is arranged such that a center axis C passing through the center of an optical image formation area of the optical modulator and being parallel to an illumination optical axis is aligned with a center axis E of a plane on the light irradiation side of the polarization plate 443. The light beams irradiated from the polarization plates 443 are combined though a dichroic prism 444 and projected in a vertically shifting direction by a projection lens 3 having an optical axis shifted upward relative to the center axis of the optical image formation area of the optical modulator. Incidentally, in the projector disclosed in Document 1, the optical modulator is arranged so that the illumination optical axis is aligned with the center axis C as shown in FIG. 7.

However, as shown in FIG. 7, in the projector disclosed in Document 1, since a lens optical axis A of the projection lens 3 is deviated from the illumination optical axis of the light beam irradiated by the light source, when the planar center of the polarization plate 443 on the light irradiation side is positioned on the center axis C of the optical image formation area of the optical modulator, there is generated on the polarization plate 443 an unnecessary area on which the light beam not to be irradiated from the projection lens as an image is incident, thus the size of the polarization plate being increased beyond necessity.

If the polarization plate is downsized too much in order to eliminate the area on which the light beam not to be irradiated from the projection lens 3 as the image is incident, the effective light beam irradiated from the projection lens 3 as image will occasionally be incident on an end surface which is not a light incident plane of the polarization plate 443. In this case, since the effective light beam incident on the end surface will be reflected to an unexpected direction from the end surface and then projected from the projection lens 3, an unexpected image will be projected other than a desired projection image.

SUMMARY

An advantage of some exemplary aspects of the invention is to provide a projector that enables downsizing of an optical modulator and preventing of a projection image from being deteriorated.

In order to achieve the advantage, a projector according to an aspect of the invention, includes: a light source device; an optical modulator arranged on an illumination optical axis of a light beam irradiated by the light source device to modulate the light beam in accordance with image information and form an optical image; a projection lens that enlarges the optical image formed by the optical modulator and projects the optical image; and an optical converter arranged between the optical modulator and the projection lens and provided with an optical conversion area that optically converts the incident light beam. The optical conversion area of the optical converter is formed in a profile on which substantially all of the light beams irradiated from the optical modulator to be irradiated from the projection lens as the optical image are incident. The optical modulator has a center axis passing though the center of an optical image formation area of the optical modulator and being parallel to the illumination optical axis. The projection lens is so arranged that a lens optical axis of the projection lens is deviated in parallel relative to the center axis of the optical modulator. And, the center axis passing through the center of the optical conversion area and being parallel to the illumination optical axis is positioned within a range between: a plane orthogonal to a deviation direction of the lens optical axis of the projection lens relative to the center axis of the optical modulator and including the center axis of the optical modulator; and a plane orthogonal to the deviation direction and including the lens optical axis.

According to the exemplary aspect of the invention, the projection lens of the projector is arranged so that the lens optical axis of the projection lens is deviated in parallel relative to the center axis of the optical modulator. In other words, in arranging the projection lens, the lens optical axis of the projection lens becomes parallel to the center axis of the optical modulator, but the axes will not be aligned with each other.

And the optical converter is arranged between the optical modulator and the projection lens, so that the optical conversion area of the optical converter is formed in a profile on which substantially all of the light beams irradiated from the optical modulator to be irradiated from the projection lens as the optical image are incident. Further, the center axis of the optical converter passing though the optical conversion area of the optical converter and being parallel to the illumination optical axis is positioned within the range between the plane orthogonal to the deviation direction and including the center axis of the optical modulator and the plane orthogonal to the deviation direction and including the lens optical axis of the projection lens.

Here, the deviation direction means a deviation direction of the lens optical axis of the projection lens relative to the center axis of the optical modulator.

Note that, when the projector includes a plurality of optical modulators and an optically combining device for combining the light beams from the plurality of optical modulators, the projection lens is arranged so that an extended line in which the lens optical axis of the projection lens is extended and refracted in an arrangement direction of each of the optical modulators from optically combining device becomes parallel to the center axis of each of the optical modulators, and besides the extended line will not be aligned with the center axis. Here, the deviation direction represents each deviation direction of the extended line of the lens optical axis refracted in the arrangement direction of each optical modulator relative to each center axis of the optical modulators.

With this arrangement, substantially all of the light beams irradiated from the optical modulator to be irradiated from the projection lens as the optical image can be incident on the optical conversion area of the optical converter for optically converting the light beams, and the useless area of the optical converter, i.e. the area on which the light beam irradiated from the optical converter to be projected from the projection lens as the optical image is not incident, can be minimized.

In other words, when the center axis of the optical converter is positioned between the two planes and the optical conversion area is extended in the deviation direction so that substantially all of the light beams irradiated from the optical modulator to be irradiated from the projection lens as the optical image are incident on the optical conversion area of the optical converter, the area, on which the light beam irradiated from the optical modulator to be irradiated from the projection lens as the optical image is not incident, in the end in the deviation direction of the optical conversion area can be minimized.

Accordingly, the end surface of the optical converter can be prevented from the incident light beam to be projected by the projection lens, and the useless area can be eliminated for downsizing the optical converter.

Preferably, in the above-described projector according to the aspect of the invention, the projection lens may have a projection area that transmits the light beam irradiated from the optical modulator to be projected as the optical image, and when assuming that: an irradiation angle of the light beam passing though an end in the deviation direction of the projection area in a light incident plane of the projection lens from the optical modulator out of the light beams irradiated from the end in the deviation direction of the optical image formation area of the optical modulator is expressed as an angle $\theta 1$; an irradiation angle of the light beam passing though an end in a direction opposite to the deviation direction of the projection area in the light incident plane of the projection lens from the optical modulator out of the light beams irradiated from the end in the direction opposite to the deviation direction of the optical image formation area of the optical modulator is expressed as an angle $\theta 2$; and a distance from a light irradiation plane of the optical modulator to a light irradiation plane of the optical converter is expressed as a distance d, the center axis of the optical converter is arranged at a position deviated from the center axis of the optical modulator in the deviation direction only by a distance corresponding to a distance L obtained by an Equation (I).

$$L = d(\tan \theta 1 - \tan \theta 2)/2 \qquad \text{Equation (I)}$$

Here, the Equation (I) can be obtained as follows.

When assuming the distance from the light irradiation plane of the optical modulator to the light irradiation plane of the optical converter as the distance d, and the irradiation angle of the light beam passing though the end in the deviation direction of the projection area in the light incident plane of the projection lens from the optical modulator out of the light beams irradiated from the end in the deviation direction of the optical image formation area of the optical modulator as the angle $\theta 1$, in order that the light beam with the irradiation angle $\theta 1$ is effectively incident on the optical converter and to be converted, when seen in the illumination optical axis direction of the light beam irradiated by the light source device, the optical converter is only required to be extended in the deviation direction relative to the image formation area only by the distance L1, and the distance L1 can be obtained by the following Equation (II).

To be more specific, the irradiation angle $\theta 1$ indicates the angle on the sharp angle side of the crossing angles defined by the light beam passing through the end in the deviation direction of the projection area in the light incident plane of the projection lens and the light beam passing through the end in the deviation direction of the projection area and being parallel to the illumination optical axis, out of the light beams irradiated from the end in the deviation direction of the optical image formation area of the optical modulator.

$$L1 = d \tan \theta 1 \qquad \text{Equation (II)}$$

When assuming the irradiation angle of the light beam passing though the end in the direction opposite to the deviation direction of the projection area in the light incident plane of the projection lens from the optical modulator out of the light beams irradiated from the end in the direction opposite to the deviation direction of the optical image formation area of the optical modulator as the angel $\theta 2$, in order that the light beam with the irradiation angle $\theta 2$ is effectively incident on the optical converter and to be converted, when seen in the illumination optical axis direction of the light beam irradiated by the light source device, the optical converter is only required to be extended in the direction opposite to the deviation direction relative to the image formation area only by the distance L2, and the distance L2 can be obtained by the following Equation (III).

To be more specific, the irradiation angle $\theta 2$ indicates the angle on the sharp angle side of the crossing angles defined by the light beam passing through the end in the direction opposite to the deviation direction of the projection area in the light incident plane of the projection lens and the light beam intersecting with the aforesaid light beam and being parallel to the illumination optical axis, out of the light beams irradiated from the end in the direction opposite to the deviation direction of the optical image formation area of the optical modulator.

$$L2 = d \tan \theta 2 \qquad \text{Equation (III)}$$

When positioning the center axis of the optical converter by deviating it in the deviation direction relative to the center axis of the optical modulator only by the distance L, the dimension of the optical conversion area of the optical converter, on which all of the light beams irradiated from the optical image formation area of the optical modulator and passing though the projection area of the projection lens to be projected from the projection lens as the optical image are incident, can be minimized. The distance L can be obtained by the following Equation (IV).

$$L = (L1 - L2)/2 \qquad \text{Equation (IV)}$$

By substituting the Equations (II) and (III) into the Equation (IV), the following Equation (I) can be obtained. With such Equation (I), it is easy to define the deviation amount in the deviation direction of the center axis of the optical converter enabling the dimension of the optical conversion area to be minimized in the deviation direction relative to the center axis of the optical modulator.

In other words, since the center axis of the optical conversion area of the optical converter is deviated only by the distance L from the plane orthogonal to the deviation direction and including the center axis of the optical modulator toward the plane orthogonal to the deviation direction and including the lens optical axis of the projection lens, substantially all of the light beams irradiated from the optical image formation area of the optical modulator and passing through the projection area of the projection lens to be projected as the optical image can be incident within the optical conversion area of the optical converter and the dimension of the optical conversion area of the optical converter in the deviation direction can be minimized as possible.

Accordingly, the optical converter can further be downsized, and the manufacturing cost of the optical converter can be saved, thereby saving the manufacturing cost of the projector.

Preferably, in the above-described projector according to the aspect of the invention, the optical converter may be a polarization film or a polarization plate that transmits a linear polarized light in a predetermined direction out of the light beams irradiated from the optical modulator.

If the optical modulator is formed by the liquid crystal panel, the optical modulator should be provided with the polarization film or the polarization plate which selectively transmits the light beam being incident on the liquid crystal panel and modulated by the liquid crystal panel. In such case, since the optical converter according to the exemplary aspect of the invention is applied to the polarization film or the polarization plate, the polarization film or the polarization plate can be downsized. Therefore, downsizing of the projector and saving of the manufacturing cost can further be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

A projector according to an exemplary embodiment of the invention will be described below with reference to the attached drawings.

1. Major Components of Projector

Figure 1:
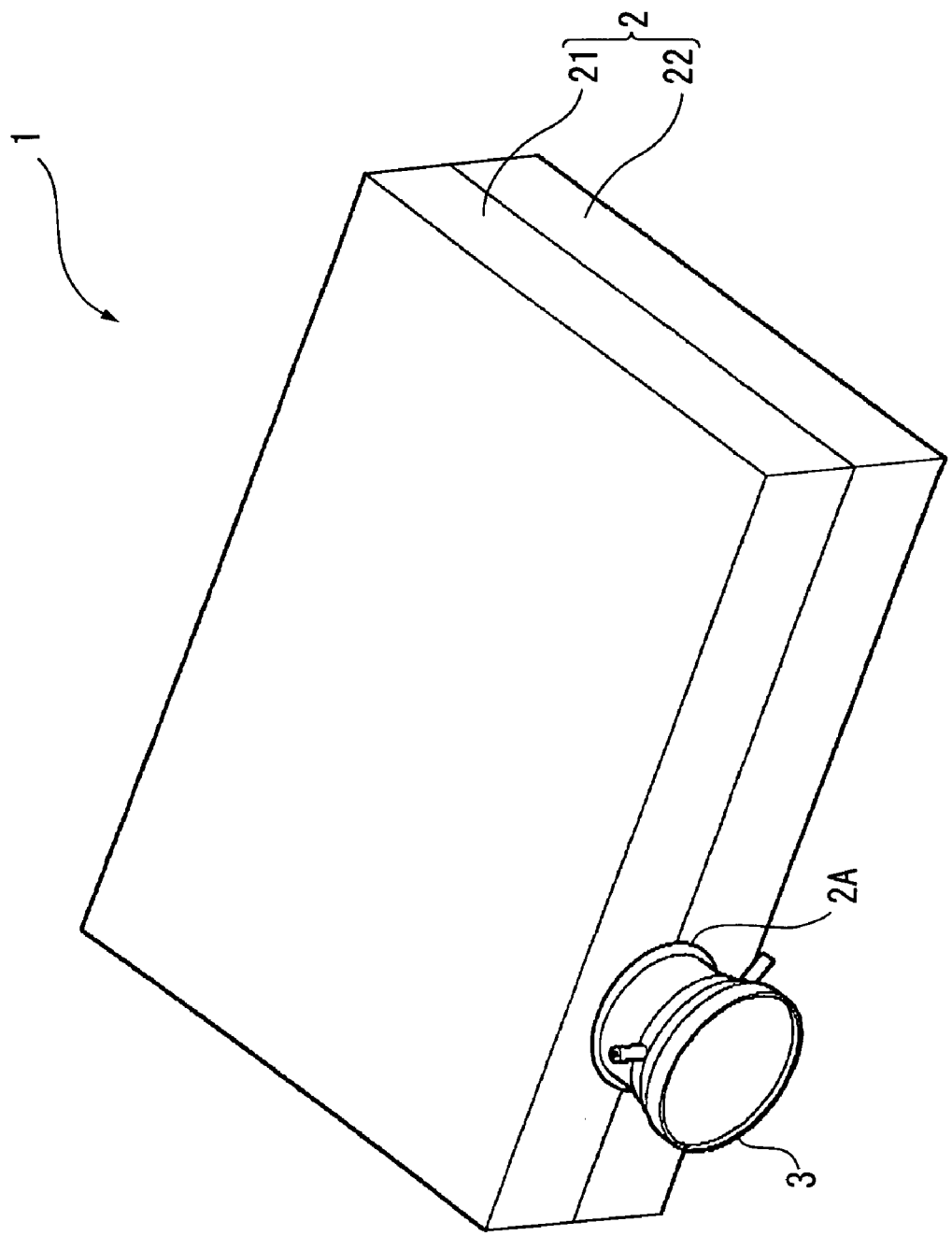
FIG. 1 is a schematic perspective view showing a projector according to an exemplary embodiment of the invention.
Figure 2:
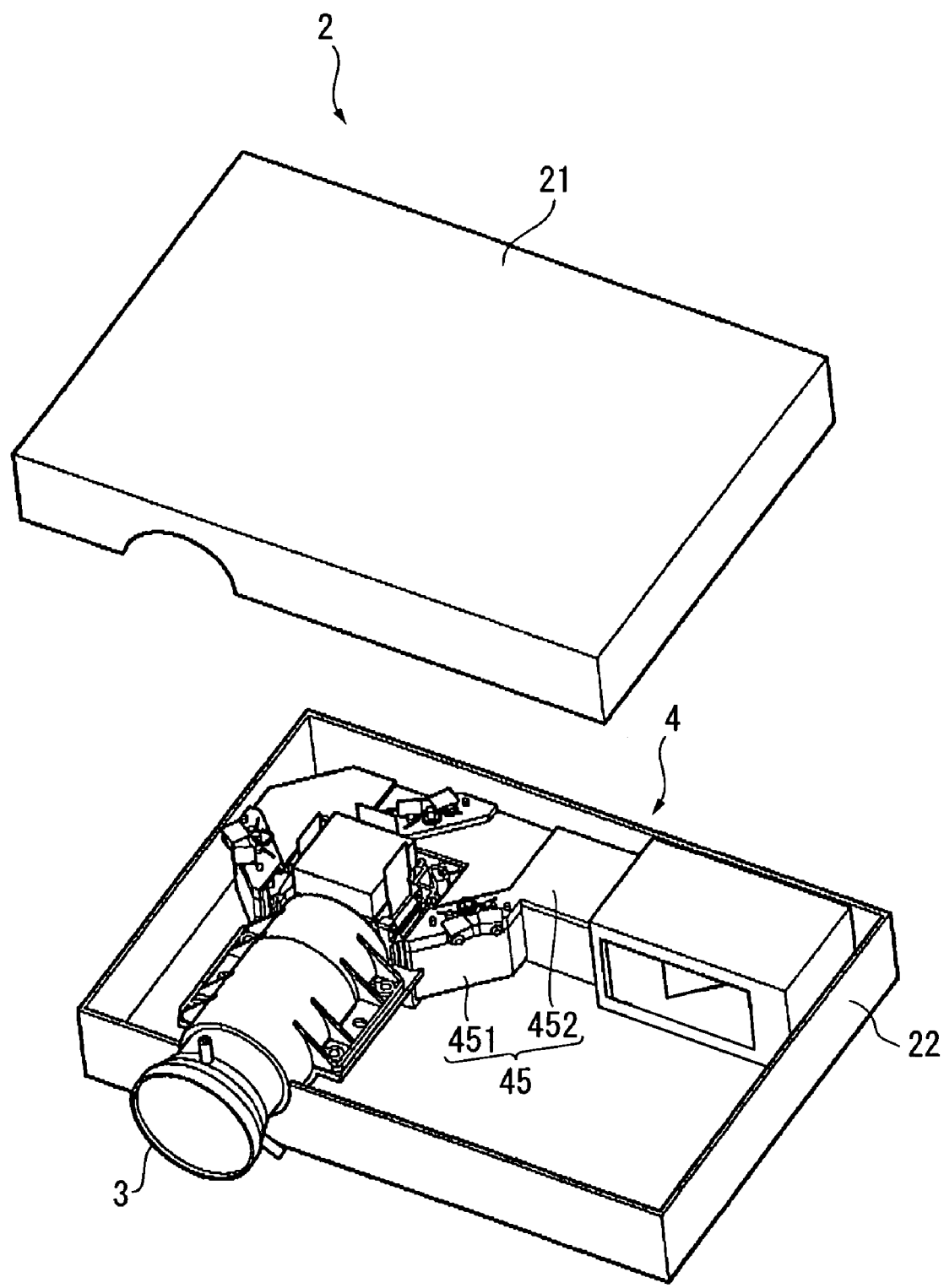
FIG. 2 is an exploded perspective view showing the projector when an upper case is removed from the state shown in FIG. 1.

FIG. 1 is a schematic perspective view showing the upper front side of a projector 1 according to the exemplary embodiment of the invention, and FIG. 2 is an exploded perspective view showing the same when an upper case 21 is removed from the state shown in FIG. 1.

As shown in FIGS. 1 and 2, the projector 1 includes an exterior case 2, which is substantially rectangular parallelepiped in whole, an optical unit 4 that optically processes a light beam irradiated by a light source and forms an optical image in accordance with image information, and a projection lens 3 as a projection optical system that projects the optical image formed by the optical unit 4 in an enlarged manner.

Though not particularly shown in FIG. 2, housed in an area not occupied by the optical unit 4 in the exterior case 2 are a cooling device that reduces heat generated in the projector 1, a control substrate that entirely controls the projector 1, a power supply unit that supplies driving power to electric components such as the cooling device and the control substrate, and the like.

The exterior case 2, includes the upper case 21 forming the top side, the front side, and the lateral sides of the projector 1, and a lower case 22 forming the bottom side, the lateral sides and the rear side of the projector 1, which are made of metal. The upper case 21 and the lower case 22 are fixed with each other by screws.

Formed on the front side of the exterior case 2 formed by the upper case 21 and the lower case 22 (a surface on a tip end side in a projection direction of the projection lens 3) is an opening 2A exposing a part of the projection lens 3. The optical image formed by the optical unit 4 is projected through the opening 2A by the projection lens 3 in an enlarged manner, and an image is displayed on a screen (not shown).

Though not shown in detail, arranged on the rear side of the exterior case 2 (a surface on a base end side in the projection direction of the projection lens 3) are a connector terminal for connecting a computer; various types of terminals for connecting equipments such as a video input terminal, a terminal for connecting an audio equipment etc.; an inlet connector; and the like. Among these, the terminals for connecting equipments are connected to the control substrate (not shown), so that signals input via the terminals for connecting equipments are processed by the control substrate. And, the inlet connector is a terminal that supplies power from an external power supply to the projector 1 via a power cable, thus electrically connecting to the power supply unit (not shown).

The optical unit 4 is a unit that optically processes the light beam irradiated by the light source device 411 and forms the optical image in accordance with the image information input via the above-mentioned terminals for connecting equipments. The optical unit 4 is substantially formed in an L-shape in plan view extending from the right lateral side along the rear side, and then to the front side along the left side of the lower case 22 as shown in FIG. 2.

2. Detailed Configuration of Optical System

Figure 3:
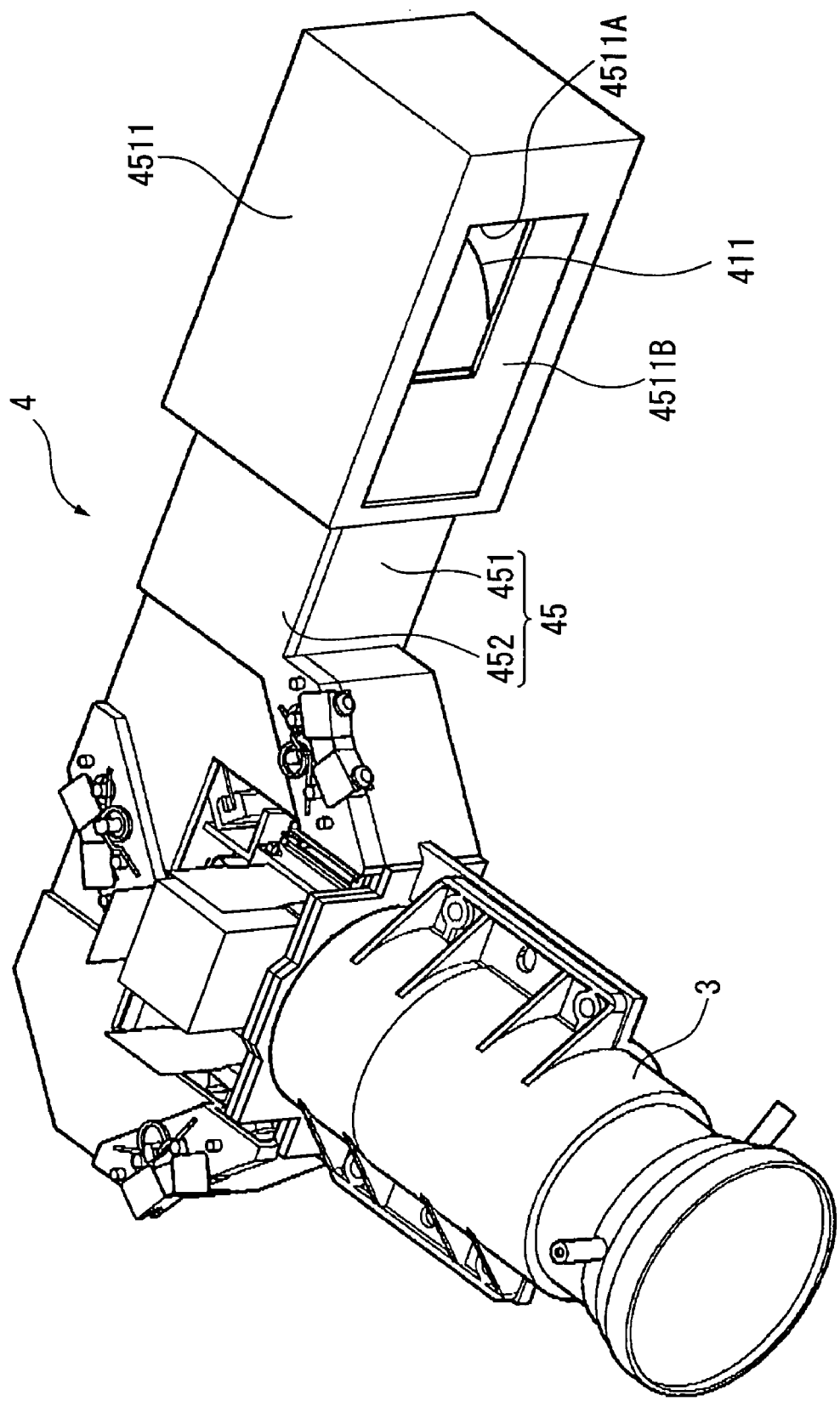
FIG. 3 is a perspective view showing the upper side of a whole optical unit of the aforesaid exemplary embodiment.

FIG. 3 is a perspective view showing the upper side of the optical unit 4 in whole. And besides, FIG. 4 is a schematic illustration showing the optical system of the optical unit 4.

Figure 4:
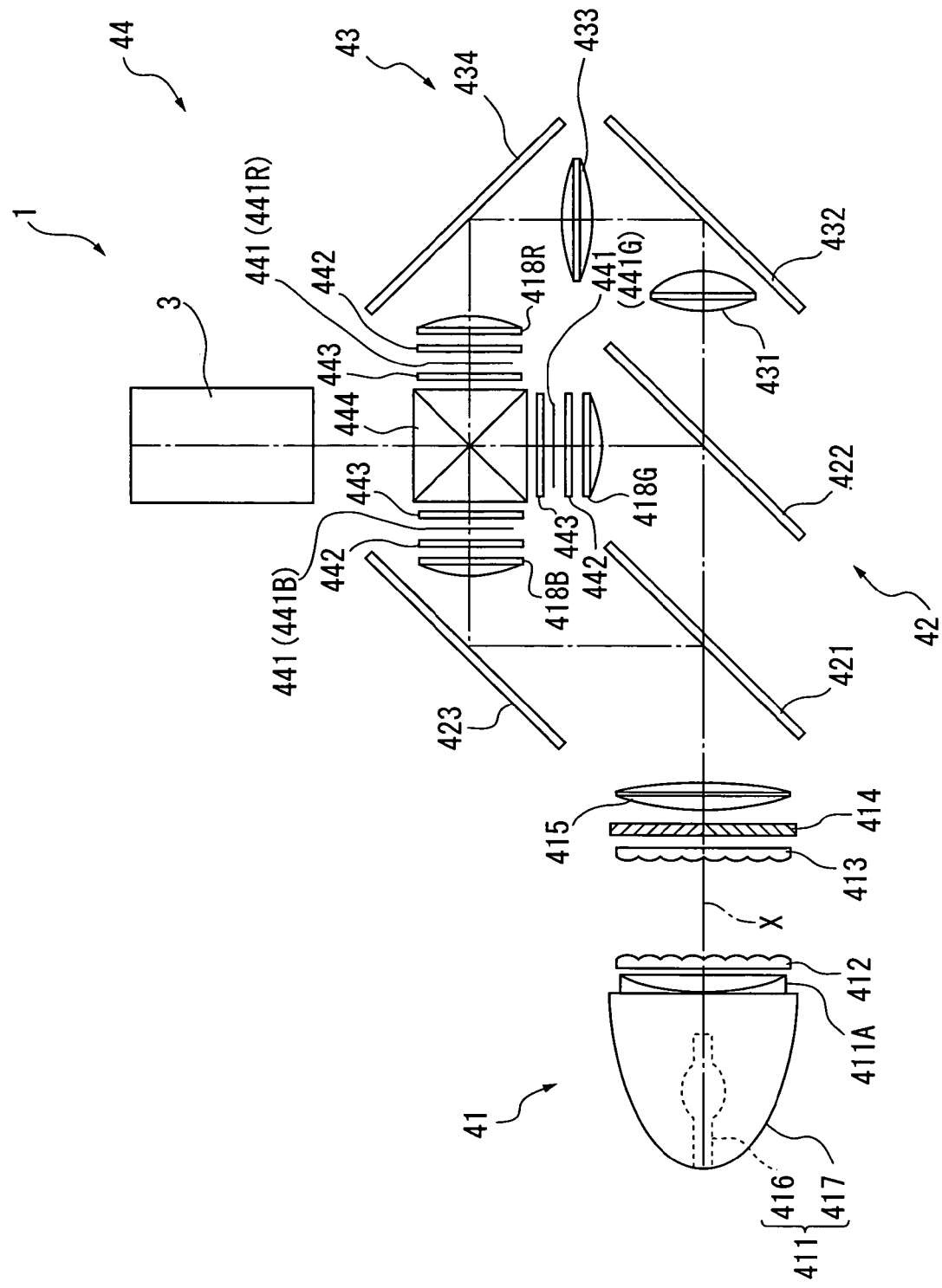
FIG. 4 is a schematic illustration showing an optical system of the projector of the aforesaid exemplary embodiment.

As shown in FIGS. 3 and 4, an illumination optical axis X (not shown in FIG. 3) defined as an optical axis of the light beam irradiated by a light source device 411 is set in the optical unit 4. The optical unit 4 includes an integrator illuminating optical system 41, a color-separating optical system 42, a relay optical system 43, an optical device 44 and an optical component casing 45 in which the optical systems 41 to 44 are arranged and housed.

As shown in FIG. 4, the integrator illuminating optical system 41 is an optical system that substantially equally illuminates image formation areas of three liquid crystal panels 441 (liquid crystal panel 441R for red light, 441G for green light, and 441R for red light) of the optical device 44, which will be described later, the integrator illuminating optical system 41 having the light source device 411, a first lens array 412, a second lens array 413, a polarization converter 414 and a superposing lens 415.

Among these, the light source device 411 includes the light source lamp 416 that irradiates a radial light beam, an ellipsoidal mirror 417 that reflects the radial light irradiated by the light source lamp 416, and a parallelizing concave lens 411A that parallelizes the light irradiated by the light source lamp 416 and reflected by the ellipsoidal mirror 417. Incidentally, a UV filter (not shown) is provided on a flat surface of the parallelizing concave lens 411A. Additionally, the light source lamp 416 may generally be a halogen lamp, a metal halide lamp or a high-pressure mercury lamp. The ellipsoidal mirror 417 and the parallelizing concave lens 411A may be replaced with a parabolic mirror.

The first lens array 412 has small lenses arranged in a matrix, the lenses having a substantially rectangular profile as seen in an optical axis direction. The respective lenses separate the light beam irradiated by the light source device 411 into a plurality of sub-beams. Each profile of the small lenses is set to be similar to each profile of the image formation areas of the liquid crystal panels 441.

The second lens array 413 is arranged substantially in the same manner as the first lens array 412, which includes small lenses arranged in a matrix. The second lens array 413 focuses the image of the small lenses of the first lens array 412 onto the liquid crystal panels 441 together with the superposing lens 415.

The polarization converter 414 is arranged between the second lens array 413 and the superposing lens 415. The polarization converter 414 converts the light from the second lens array 413 into uniform linear polarized light, thereby enhancing the light utilization efficiency of the optical device 44.

Specifically, the respective sub-beams converted into the uniform linear polarized light by the polarization converter 414 is substantially superposed on the liquid crystal panels 441R, 441G and 441B of the optical device 44 by the superposing lens 415. Since only one-type of linear polarized light can be used in a projector using the liquid crystal panels that modulate a linear polarized light, substantially half of the light beam from the light source device 411 emitting random polarized light cannot be used.

Accordingly, with the use of the polarization converter 414, the light beam irradiated by the light source device 411 is converted into the uniform linear polarized light to enhance the light utilization efficiency of the optical device 44. Incidentally, such polarization converter 414 is disclosed in, for instance, JP-A-8-304739.

The color-separating optical system 42, which has two dichroic mirrors 421 and 422, and a reflection mirror 423, separates the plurality of sub-beams irradiated from the integrator illuminating optical system 41 by the dichroic mirrors 421 and 422 into three color lights of red, green and blue.

At this time, the dichroic mirror 421 of the color-separating optical system 42 reflects the blue light component of the light beam irradiated from the integrator illuminating optical system 41 and transmits the red light component and green light component. The blue light reflected by the dichroic mirror 421 is reflected by the reflection mirror 423, which reaches the liquid crystal panel 441B for blue light through a field lens 418B. The field lens 418B converts the respective sub-beams irradiated by the second lens array 413 into a light beam parallel to an illumination optical axis X thereof. The field lenses 418G, 418R provided on the light-incident side of the other liquid crystal panels 441G and 441R function in the same manner.

In the red and green lights transmitted through the dichroic mirror 421, the green light is reflected by the dichroic mirror 422 to reach the liquid crystal panel 441G for green light through a field lens 418G. On the other hand, the red light is transmitted through the dichroic mirror 422 and reaches the relay optical system 43.

The relay optical system 43 has an incident-side lens 431, a relay lens 433 and reflection mirrors 432 and 434, and guides the color light, i.e. red light separated by the color-separating optical system 42 toward the liquid crystal panel 441R. Note that, the relay optical system 43 is used for an optical path of the red light in order to avoid deterioration in the light utilization efficiency on account of light dispersion and the like caused by the longer length of the optical path of the red light than the optical path of the other color lights. In other words, it is because the sub-beams incident on the incident-side lens 431 are directly transmitted to the liquid crystal panel 441R via the field lens 418R.

Incidentally, though the red light of the three color lights passes through the relay optical system 43, the blue light, for instance, may alternatively pass through the relay optical system 43.

The optical device 44 modulates the incident light beam in accordance with the image information to form a color image. The optical device 44 has three incident-side polarization plates 442 on which the respective color lights separated by the color-separating optical system 42 are incident, the liquid crystal panels 441 (441R, 441G and 441B) as optical modulators and irradiate-side polarization plates 443 arranged on the downstream of the respective incident-side polarization plates 442, and a cross dichroic prism 444 as a color-combining optical device.

The incident-side polarization plate 442 only transmits a linear polarized light in a predetermined direction out of the incident light beam and absorbs the other light beam. The incident-side polarization plate 442 has a light-transmissive substrate made of sapphire glass, crystal or the like with a polarization film provided on the substrate.

The liquid crystal panels 441 each have a pair of glass substrates (not shown) with liquid crystal as electro-optic material sealed therebetween. One of the substrates defines a driver substrate for driving the liquid crystal, having a plurality of data lines arranged in parallel to each other, a plurality of scanning lines arranged in a direction orthogonal to the plurality of data lines, picture electrodes arranged in a matrix corresponding to the intersection of the scanning lines and the data lines, and switching elements such as TFTs. The other one of the substrates defines an opposite substrate confronting the above-described substrate with a predetermined space, having common electrodes to which a predetermined voltage Vcom is applied. To the pair of substrates, a flexible printed substrate (not shown) is connected. The flexible printed substrate is electrically connected to the control substrate (not shown) and outputs predetermined driving signals to the scanning lines, the data lines, the switching elements, the common electrodes, and the like. When the driving signals are input from the control substrates via the flexible printed substrate, the voltage is applied between the predetermined picture electrodes and the common electrodes, so that the arrangement of the liquid crystal present between the picture electrodes and the common electrodes are controlled, thus modifying the polarization direction of the polarized light irradiated from the incident-side polarization plate 442.

The irradiation-side polarization plate 443, out of the light beams irradiated from the liquid crystal panel 441, only transmits the light beam with the polarization axis orthogonal to a transmission axis of the light beam in the incident-side polarization plate 442 and absorbs the other light beams. Though not particularly shown in FIG. 4, the irradiation-side polarization plate 443 also has a light-transmissive substrate 443A (see FIGS. 5 and 6) with a polarization film 443B (see FIGS. 5 and 6) provided thereon, in the same manner as the incident-side polarization plate 442.

The arranged positions of the irradiation-side polarization plates 443 relative to the liquid crystal panels 441 will be described later in detail.

The cross dichroic prism 444 combines the optical image irradiated by each of the irradiation-side polarization plates 443 and modulated for each color light to form a color image. The cross dichroic prism 444 is substantially square in plan view formed by attaching four right-angle prisms, and two dielectric multi-layer films are formed on the boundaries where the right-angle prisms are attached to each other. These dielectric multi-layer films reflect the color lights irradiated by the liquid crystal panels 441R and 441B and passed through the irradiation-side polarization plates 443, and transmit the color light irradiated by the liquid crystal panel 441G and passed through the irradiation-side polarization plate 443. In this way, the color lights respectively modulated by the liquid crystal panels 441R, 441G and 441B are combined to form a color image.

As shown in FIG. 3, the above-described optical systems 41 to 44 are housed in the optical component casing 45 made of synthetic resin. The optical component casing 45 is formed by a boxy component housing member 451 defining the bottom side, the front side and the lateral sides of the optical component casing 45, and a lid member 452 that closes an upper opening of the component housing member 451.

The component housing member 451 includes a light source housing 4511 that houses the light source device 411, and an optical component housing 4512 that houses the optical components 412 to 415, 419, 42 and 43.

Though not shown, the light source housing 4511 is opened at a lower part thereof, and is formed in a box having a rectangular opening 4511A in the inner surface thereof. The light source device 411 is inserted from the lower part of the light source housing 4511 and set on a fixing plate 4511B to be housed in the light source housing 4511.

Note that, a part of the fixing plate 4511B is cut, so that a front part of the light source device 411 is closed while a rear part is opened due to the fixing plate 4511B and the opening 4511A formed in the light source housing 4511.

The closed state in the front part of the light source device 411 prevents the light beam irradiated by the light source device 411 from leaking to the outside, while the opened state in the rear part prevents heat generated by the light source device 411 from staying inside the light source housing 4511.

Though not shown in detail, the optical component housing 4512 has a plurality of grooves for positioning and fixing the optical components 412 to 415, 419, 42 and 43 inside the optical component housing 4512. The optical components are slid to be fitted into the grooves, and then fixed with an adhesive or the like.

3. Arranged Position of Irradiation-Side Polarization Plate

Figure 5:
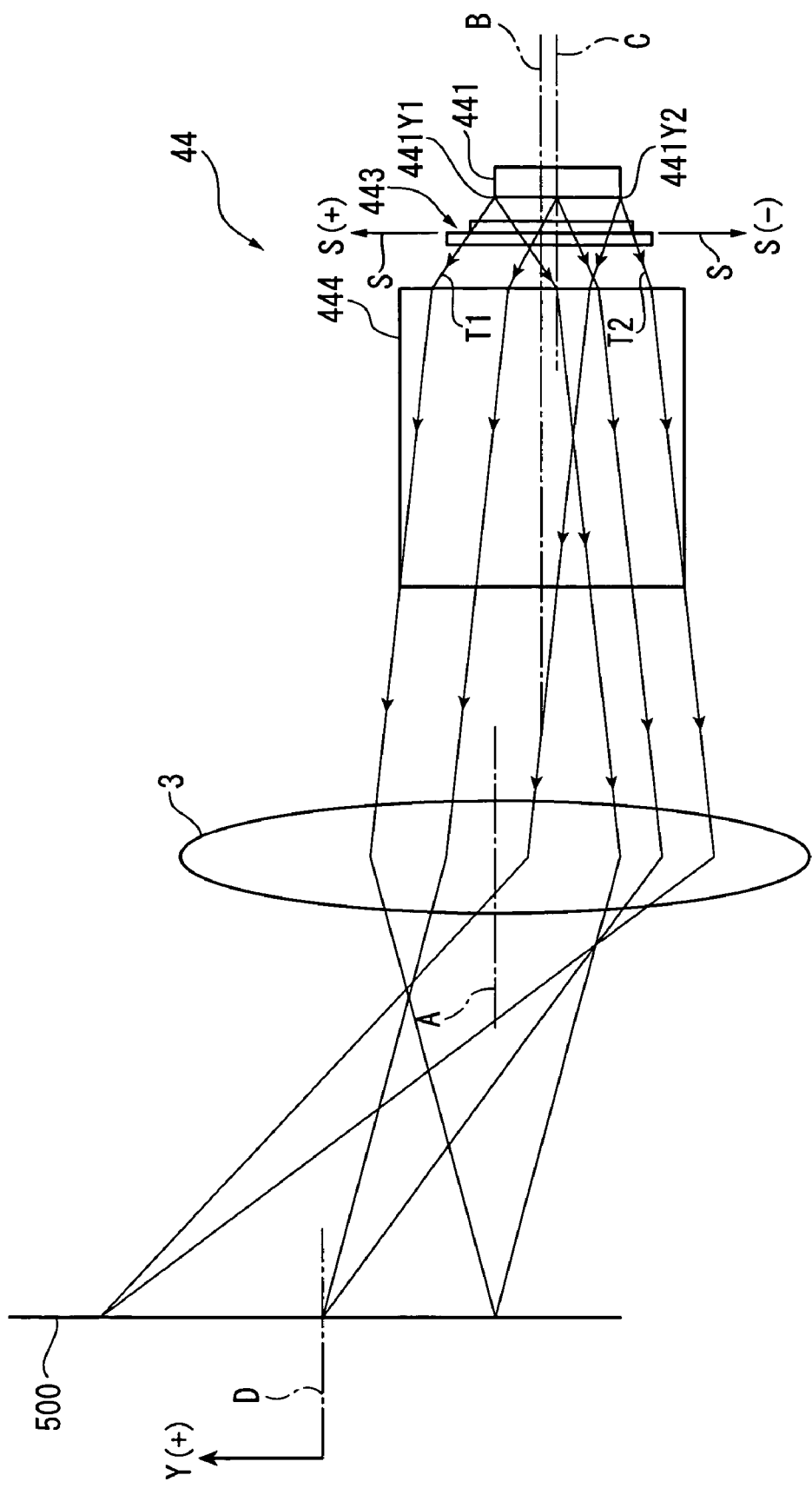
FIG. 5 is a schematic illustration showing arranged positions of optical components of the optical device of the aforesaid exemplary embodiment.
Figure 6:
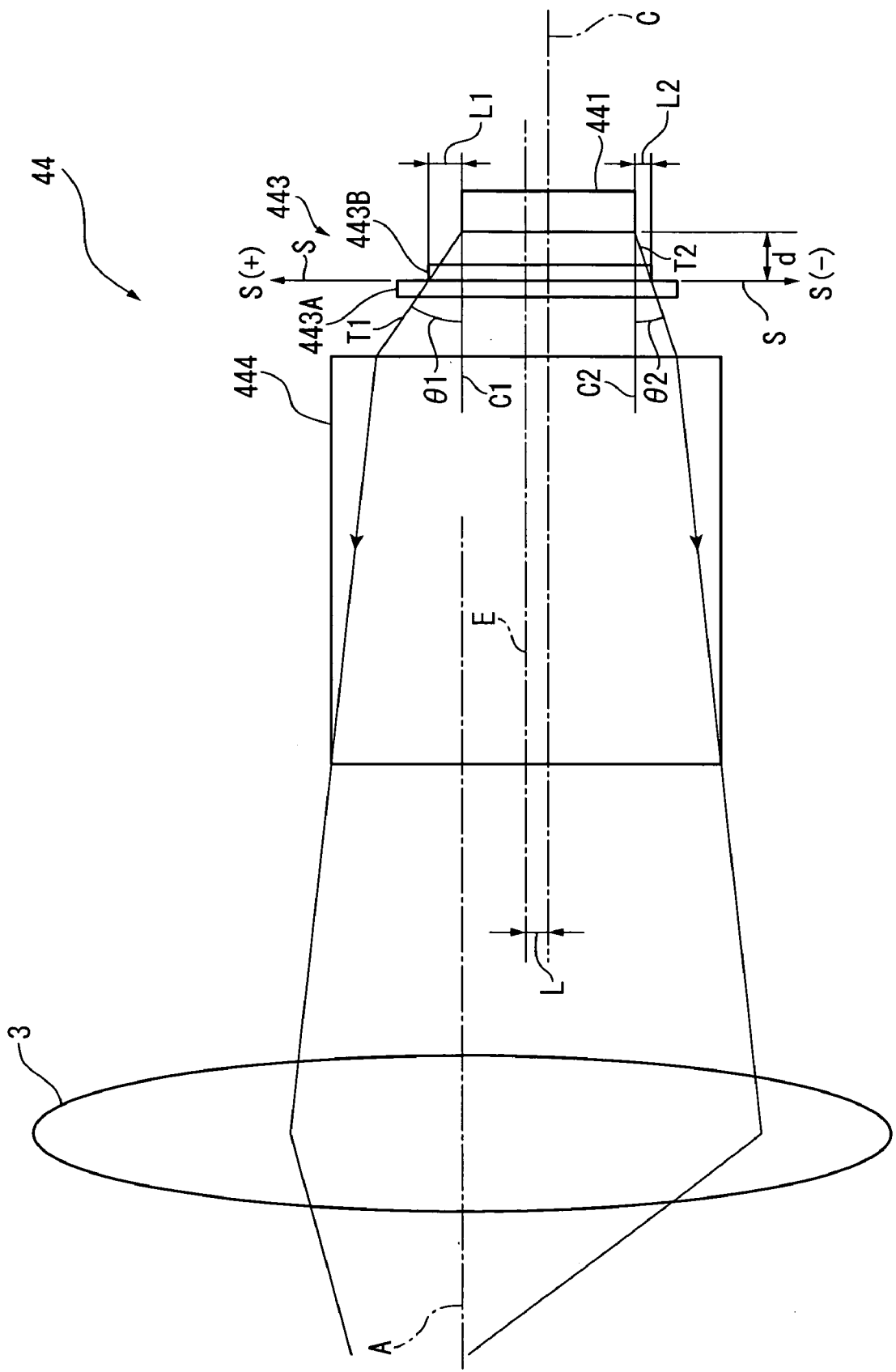
FIG. 6 is a partly enlarged view of FIG. 5.
Figure 7:
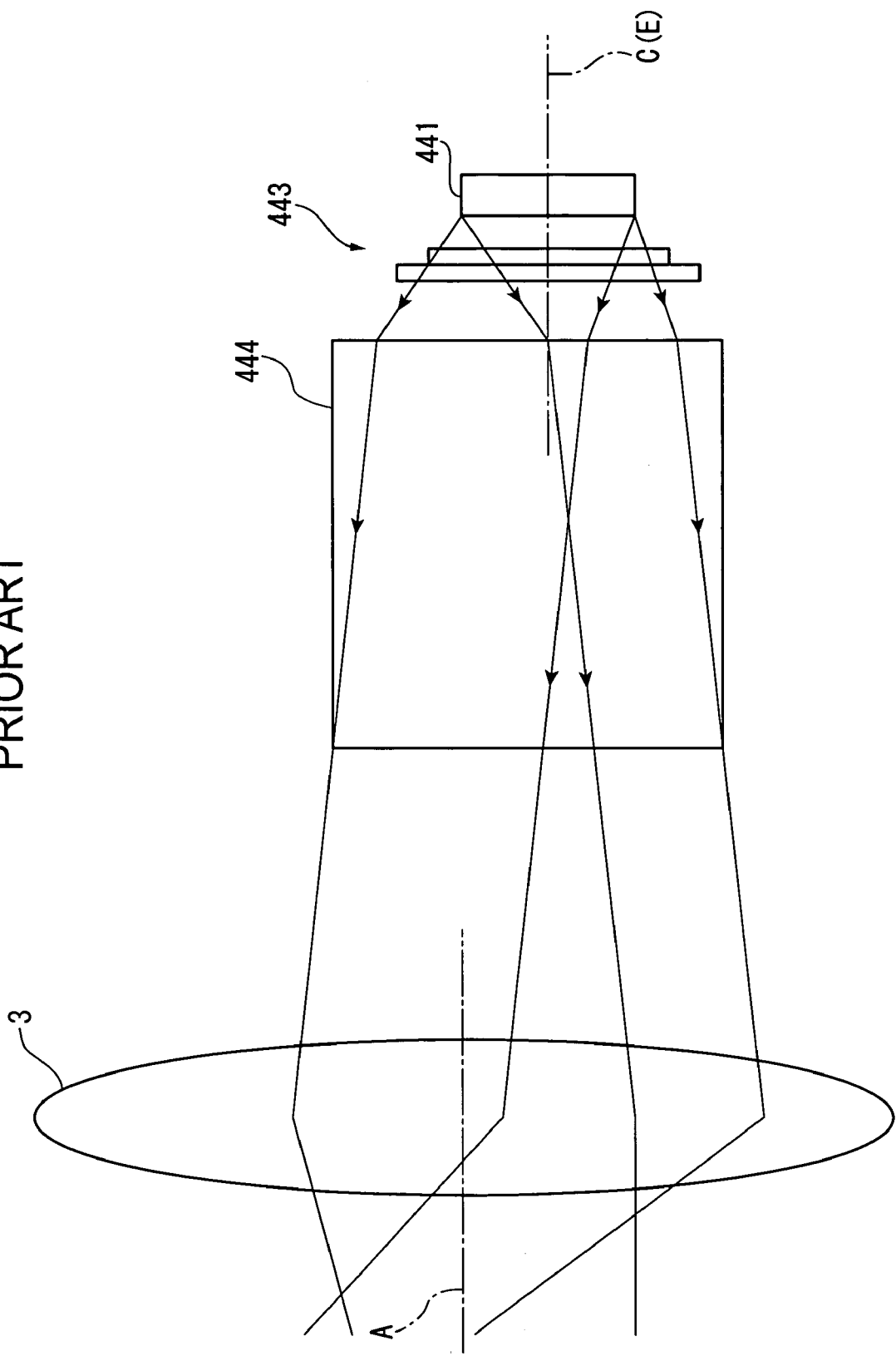
FIG. 7 is a schematic illustration showing arranged positions of optical components of an optical device according to a related art.

FIG. 5 is a side view schematically showing the arranged positions of the liquid crystal panel 441 (441G) of the optical device 44, the irradiation-side polarization plate 443, the cross dichroic prism 444 and the projection lens 3. FIG. 6 is a partly enlarged view of FIG. 5. In FIGS. 5 and 6, the plurality of lenses consisting the projection lens 3 are expressed as one lens for schematically showing purposes.

As shown in FIGS. 5 and 6, the optical device 44 includes the incident-side polarization plate 442 (not shown in FIGS. 5 and 6), the liquid crystal panel 441 (in FIGS. 5 and 6, only the liquid crystal panel 441G for modulating the green light is illustrated whereas the other liquid crystal panels 441R and 441B are omitted), the irradiation-side polarization plate 443 and the cross dichroic prism 444 arranged in the incident order of the light beam irradiated by the light source device 411. Additionally, the projection lens 3 is arranged on the light irradiation side of the cross dichroic prism 444.

The light beam irradiated by the light source device 411 is incident on the liquid crystal panel 441 via the incident-side polarization plate 442 in the above-described manner. The light beam incident on the liquid crystal panel 441 is modulated in an image formation area (an optical image formation area) of the liquid crystal panel 441, and then irradiated toward the irradiation-side polarization plate 443. Out of the light beam incident on the irradiation-side polarization plate 443, the light beam aligned with the polarization axis of the polarization film 443B passes through the polarization film 443B and is incident on the light incident plane of the cross dichroic prism 444. The incident light beam passes through the cross dichroic prism 444 while being refracted with a predetermined refraction index, is irradiated from the light irradiation plane of the cross dichroic prism 444, and then is incident on a projection area of the projection lens 3.

The projection lens 3 is so configured that a lens optical axis A of the projection lens 3 is deviated in parallel relative to an illumination optical axis X (see FIG. 4) of the light beam irradiated by the light source device 411, thus projecting the incident optical image in a vertically shifting direction, namely in a deviation direction. Incidentally, in the exemplary embodiment, the illumination optical axis X is arranged to be substantially aligned with a line C (hereinafter, also referred to as 'a center axis C of the liquid crystal panel 441') passing though the center of the image formation area of the liquid crystal panel 441 and being parallel to the illumination optical axis X of the light beam irradiated by the light source device 411. Accordingly, the lens optical axis A of the projection lens 3 is deviated in parallel relative to the center axis C of the liquid crystal panel 441, so that the deviation direction defines the vertically shifting direction in which the optical image is projected with the projection lens 3.

Specifically, the projection lens 3 is arranged such that the lens optical axis A of the projection lens 3 is deviated in the vertical shifting direction perpendicular to the illumination optical axis X (in the arrow Y(+) direction in FIG. 5) relative to the center axis C of the liquid crystal panel 441. Owing to this, a center axis D of a projection area 500 of the light beam as the optical image irradiated from the projection lens 3 is deviated in the Y(+) axis direction from the lens optical axis A of the projection lens 3, and consequently, the projection area 500 is projected from the projection lens 3 in the vertically shifting direction.

Note that, the projection area of the projection lens 3 is an area within an effective aperture of the projection lens 3, which represents an area thorough which the light beam irradiated from the liquid crystal panel 441 to be irradiated from the projection lens 3 as a desired optical image passes within the projection lens 3. The light beam corresponding to the projection lens 3 represents the light beam irradiated from the liquid crystal panel 441 and being incident within the effective aperture of the projection lens 3 to be irradiated from the projection lens 3. On the other hand, the light beam not corresponding to the projection lens 3 represents the light beam irradiated from the liquid crystal panel 441 but not being incident within the effective aperture of the projection lens 3, thus not being irradiated from the projection lens 3.

Additionally, a center axis B of a light incident plane of the cross dichroic prism 444 is arranged at a position deviated in parallel in the vertically shifting direction (in the Y(+) direction) relative to the center axis C so as to be located between the lens optical axis A of the projection lens 3 and the center axis C of the liquid crystal panel 441.

Incidentally, the dimension in the vertically shifting direction (the dimension in the Y(+) direction) of a light irradiation plane of the cross dichroic prism 444 is so determined that the light beam not corresponding to the projection lens 3 out of the light beams irradiated from the liquid crystal panel 441 is not irradiated from the light irradiation plane, and thereby the cross dichroic prism 444 is downsized. And, a deviation amount between the center axis B of the light incident plane of the cross dichroic prism 444 and the center axis C of the liquid crystal panel 441 is determined by the quantity ratio of the ambient light of the projection lens 3. For instance, the deviation amount of the center axis B of the cross dichroic prism 444 relative to the center axis C of the liquid crystal panel 441 is described in JP-A-2004-4666 in detail.

The irradiation side polarization plate 443 is provided with the polarization film 443B on a light incident surface of the light-transmissive substrate 443A as mentioned before.

The polarization film 443B corresponds to an optical converter of the invention, which only transmits the light beam with the polarization axis orthogonal to the light transmission axis of the incident-side polarization plate 442. The light transmission area of the polarization film 443B is defined as an optical conversion area, which covers the image formation area of the liquid crystal panel 441 when seen from the light irradiation side.

The center of the optical conversion area in the light irradiation plane of the polarization film 443B (hereinafter, occasionally referred to as 'the center of the polarization film 443B') is located between: the a virtual plane orthogonal to the deviation direction (the vertically shifting direction) of the lens optical axis A of the projection lens 3 relative to the center axis C of the liquid crystal panel 441 and including the center axis C; and another virtual plane orthogonal to the deviation direction (the vertically shifting direction) and including the lens optical axis A.

Specifically, the center of the polarization film 443B is positioned on a line S which is respectively orthogonal to the center axis C and the lens optical axis A, and away from the light irradiation plane of the liquid crystal panel 441 by a predetermined distance in the illumination optical axis X direction.

More specifically, the center of the polarization film 443B is located within a range from an intersection point of the line S and the center axis C to an intersection point of the line S and the lens optical axis A. The line passing through the center of the polarization film 443B and being parallel to the illumination optical axis is illustrated as a center axis E of the polarization film 443B in FIG. 6.

In other words, the direction heading in the intersection point of the line S and the lens optical axis A from the intersection point of the line S and the center axis C (i.e., the S(+) direction) becomes the same direction as the vertically shifting direction (the Y(+) direction) when seen in the illumination optical axis X direction.

Accordingly, the dimension of the polarization film 443B can be downsized, the polarization film 443B covering the optical path of all of the light beams which are incident on the projection area of the projection lens 3 from the image formation area of the liquid crystal panel 441 though the cross dichroic prism 444.

In other words, since the polarization film 443B is arranged corresponding to the optical path of the light beam incident on the projection lens 3 from the liquid crystal panel 441, the light beam irradiated from the image formation area of the liquid crystal panel 441 can effectively be incident on the light incident plane of the polarization film 443B. Therefore, in the light incident plane of the polarization film 443B, the area with no incident light beam can be minimized, thus promoting the downsizing of the polarization film 443B.

Specifically, the center of the polarization film 443B is determined by: an irradiation angle of the light beam irradiated from an end in the vertically shifting direction of the image formation area of the liquid crystal panel 441 out of the light beams incident on the end in the vertically shifting direction of the projection area of the projection lens 3; and an irradiation angle of the light beam irradiated from an end in a direction opposite to the vertically shifting direction of the image formation area of the liquid crystal panel 441 out of the light beams incident on the end in the direction opposite to the vertically shifting direction of the projection area of the projection lens 3.

In other words, the center of the polarization film 443B is determined by: a maximum irradiation angle of the light beam irradiated in the vertically shifting direction from the end in the vertically shifting direction of the image formation area; and a maximum irradiation angle of the light beam irradiated in the direction opposite to the vertically shifting direction from the end in the direction opposite to the vertically shifting direction, out of the light beams irradiated from the image formation area of the liquid crystal panel 441 and corresponding to the projection lens 3.

Note that, the irradiation angle of the light beam indicates the angle on the sharp angle side of the crossing angles defined by the optical path of the light beam irradiated from the image formation area of the liquid crystal panel 441 and the optical path of the light beam parallel to the illumination optical axis X.

The positioning of the center of the polarization film 443B will be described below.

The light beam passing though an end 441Y1 in the vertically shifting direction of the image formation area of the liquid crystal panel 441 and being incident on the end in the vertically shifting direction in the projection area of the projection lens 3 is an optical path T1 of the light beam irradiated on an outermost end side in the S(+) direction as shown in FIGS. 5 and 6. The angle defined by the optical path T1 and a line C1 passing through the end 441Y1 and being parallel to the center axis C can be expressed as an angel θ1. The angle θ1 is the maximum irradiation angle of the light beam irradiated from the end 441Y1 of the image formation area in the vertically shifting direction and corresponding to the projection lens 3.

On the other hand, the light beam passing though an end 441Y2 in the direction opposite to the vertically shifting direction of the image formation area of the liquid crystal panel 441 and being incident on the end in the direction opposite to the vertically shifting direction of the projection area of the projection lens 3 is an optical path T2 irradiated on an outermost end side in the S(−) direction. The angle defined by the optical path T2 and a line C2 passing through the end 441Y2 and being parallel to the center axis C can be expressed as an angel θ2. The angle θ2 is the maximum irradiation angle of the light beam irradiated from the end 441Y2 of the image formation area in the direction opposite to the vertically shifting direction and corresponding to the projection lens 3.

Assume that, the distance from the light irradiation plane of the liquid crystal panel 441 to the line S intersecting with the center of the polarization film 443B, i.e., the distance from the light irradiation plane of the liquid crystal panel 441 to the light irradiation plane of the polarization film 443B is a distance d. In this case, in order that the light beam irradiated from the end 441Y1 of the liquid crystal panel 441 in the S(+) direction with the maximum irradiation angle θ1 is incident on the polarization film 443B, the polarization film 443B should be extended from the inter section point of the line S and the line C1 only by a distance L1 in the S(+) direction, or in the vertically shifting direction. The distance L1 can be expressed by the following Equation (II).

$$L1 = d\tan\theta 1 \qquad \text{Equation (II)}$$

And, in order that the light beam irradiated from the end 441Y2 in the S(−) direction with the maximum irradiation angle θ2 is incident on the polarization film 443B, the polarization film 443B should be extended from the inter section point of the line S and the line C2 only by a distance L2 in the S(−) direction, or in the direction opposite to the vertically shifting direction. The distance L2 can be expressed by the following Equation (III).

$$L2 = d\tan\theta 2 \qquad \text{Equation (III)}$$

Using the distances L1 and L2, a distance L, which is the deviation amount of the center of the light irradiation plane of the polarization film 443B relative to the center axis C of the image formation area of the liquid crystal panel 441, is determined by the following Equation (IV). Accordingly, since the center of the polarization film 443B is positioned to be deviated from the center axis C in the deviation direction only by the distance L, all of the light beams irradiated from the image formation area of the liquid crystal panel 441 and being incident on the projection area of the projection lens 3 can be incident on the optical conversion area of the polarization film 443B. Therefore, the dimension of the polarization film 443B in the vertically shifting direction can be minimized as possible.

$$L = (L1 - L2)/2 \qquad \text{Equation (IV)}$$

By substituting the Equations (II) and (III) into the Equation (IV), the following Equation (I) can be obtained.

$$L = d(\tan\theta 1 - \tan\theta 2)/2 \qquad \text{Equation (I)}$$

In other words, the center of the polarization film 443B is merely the distance d away from the light irradiation plane of the liquid crystal panel 441 in the optical axis direction, and is positioned on the line S respectively orthogonal to the center axis C of the image formation area and the lens optical axis A of the projection lens 3. And besides, the center of the polarization film 443B is deviated from the intersection point of the line S and the center axis C in the S(+) direction heading to the intersection point of the line S and the lens optical axis A, namely, in the vertically shifting direction only by the distance L obtained by the before-mentioned Equation (I).

Owing to this, all of the light beams irradiated from the image formation area of the liquid crystal panel 441 and corresponding to the projection area of the projection lens 3 can be incident on the optical conversion area of the polarization film 443B. In other words, it can be prevented that the light beam irradiated from the liquid crystal panel 441 and corresponding to the projection lens 3 is incident on the end surface of the polarization film 443B parallel to the center axis C of the liquid crystal panel 441, and the dimension of the polarization film 443B in the vertically shifting direction can be minimized. Accordingly, the polarization film 443B can further be downsized. Note that, even when the light beam not corresponding to the projection lens 3 is incident on and reflected by the end surface of the polarization film 443B, such light beam will not be irradiated from the projection lens 3, and the light quantity of the light beam not corresponding to the projection lens 3 is extremely small, thus causing no troubles.

The dimension of the polarization film 443B in the vertically shifting direction can be minimized, when the center of the polarization film 443B is positioned to be deviated from the center axis C of the liquid crystal panel 441 in the vertically shifting direction only by the distance L obtained by the above-described Equation (I) and the dimension of the polarization film 443B in the vertically shifting direction is represented as a dimension M expressed by the following Equation (V). Accordingly, the polarization film 443B can be formed as compact as possible. This enables the manufacturing cost of the projector 1 to be saved.

Note that, in the following Equation (V), 'm' represents the dimension of the image formation area of the liquid crystal panel 441 in the vertically shifting direction.

$$M = m + d(\tan\theta 1 + \tan\theta 2) \qquad \text{Equation (V)}$$

Incidentally, in FIGS. 5 and 6, the liquid crystal panel 441G for modulating the green light is represented as the liquid crystal panel 441, and the arranged position of the irradiation-side polarization plate 443 targets the one arranged on the light irradiation-side of the liquid crystal panel 441G. However, the same applies to the arranged position of the irradiation-side polarization plate 443 on the light irradiation side of the liquid crystal panel 441R or 441B. That is, since FIGS. 5 and 6 are schematic illustrations showing the optical path from the liquid crystal panel 441 to the projection lens 3 on the one plane, the liquid crystal panels 441R, 441G, 441B should be located at the same position in FIGS. 5 and 6, thus any one of these being represented as the liquid crystal panel 441.

In particular, the line S is defined, which is respectively orthogonal to the center axis C of the liquid crystal panel 441R and to an extended line of the lens optical axis A of the projection lens 3 refracted in the arrangement direction of the liquid crystal panel 441 by a boundary of the right-triangle prism of the cross dichroic prism 444, and is away from the light irradiation plane of the image formation area of the liquid crystal panel 441 by the distance d. The center of the light irradiation plane of the optical conversion area of the polarization film 443B is located at the position away from the intersection point of the line S and the center axis C toward the intersection point of the line S and the extended line of the lens optical axis A only by the distance L. Accordingly, the substantially same advantages as the irradiation-side polarization plate 443 arranged on the light irradiation side of the liquid crystal panel 441G can be attained.

Incidentally, the same can be applied to the polarization film 443B of the irradiation-side polarization plate 443 arranged on the downstream of the liquid crystal panel 441B.

In other words, the centers of the optical conversion areas of the three polarization films 443B respectively arranged on the light irradiation side of the liquid crystal panels 441 (441R, 441G, 441B) are each positioned within the range between: the virtual plane including the center axis C of the image formation areas of the liquid crystal panel 441 and being orthogonal to the deviation direction of the lens optical axis A of the projection lens 3 relative to the center axis C of the liquid crystal panel 441; and the virtual plane including the lens optical axis A and being orthogonal to the deviation direction of the lens optical axis A of the projection lens 3 relative to the center axis C of the liquid crystal panel 441.

4. Modifications of Embodiment

Although the best configuration for implementing the invention is disclosed above, the invention is not restricted thereto. That is, the invention is illustrated and described mainly on the specific exemplary embodiment, however, a person skilled in the art can modify the specific configuration such as shape, material, quantity on the above-described exemplary embodiment as long as a technical idea and an advantage of exemplary aspects of the invention can be achieved.

Therefore, the description that limits the shape and the material is only the example to make the invention easily understood, but does not intend to limit the invention, so that the invention includes the description using a name of component without a part of or all of the limitation on the shape and the material etc.

In the above-described exemplary embodiment, the center of the optical conversion area in the light irradiation plane of the polarization film 443B is deviated from the center axis C of the liquid crystal panel 441 in the vertically shifting direction heading to the lens optical axis A of the projection lens 3 only by the distance L obtained by the beforementioned Equation (I), however it is not limited thereto.

In other words, it is only required that the optical conversion area of the polarization film 443B is formed so as to transmit substantially all of the light beams irradiated from the optical image formation area of the liquid crystal panel 441 and being incident on the projection area of the projection lens 3 to be irradiated as the optical image, and the center axis E parallel to the illumination optical axis X passing though the center of the polarization film 443B is positioned within the range from: the plane including the center axis C of the liquid crystal panel 441 and being orthogonal to the deviation direction of the lens optical axis A of the projection lens 3 relative to the center axis C of the liquid crystal panel 441; and the plane including the lens optical axis A and being orthogonal to the deviation direction of the lens optical axis A relative to the center axis C.

In such case, at least the dimension of the polarization film 443B can be downsized in the deviation direction of the lens optical axis A of the projection lens 3 relative to the center axis C of the liquid crystal panel 441, i.e., in the vertically shifting direction.

Incidentally, if the center of the polarization film 443B is so arranged that the center axis E of the polarization film 443B is deviated in the vertically shifting direction from the center axis C of the liquid crystal panel 441 only by the distance L, the polarization film 443B on which substantially all of the light beams irradiated from the liquid crystal panel 441 and corresponding to the projection lens 3 are incident can further be downsized.

In the above-described exemplary embodiment, although the center of the polarization film 443B of the irradiation-side polarization plate 443 arranged on the downstream of the liquid crystal panel 441 is deviated relative to the center axis C of the liquid crystal panel 441 as well as the lens optical axis A of the projection lens 3, the invention may employ other optical converter that optically converts the incident light beam without limiting to the polarization film. Or, other optical converter may be provided on the irradiation-side polarization plate 443 together with the polarization film 443B, so that the center of the optical conversion area in the light irradiation plane of the optical converter is deviated. For example, a visual-angle corrector film for correcting the visual angle of the optical image formed by the liquid crystal panel 441 may be employed as the optical converter. In this case, not only the visual-angle corrector film can be downsized as mentioned before, but also the visual angle of the projection image can be widened, thus remarkably enhancing the contrast of the projection image.

In the above-described exemplary embodiment, although the projection lens 3 is fixed, the projection lens 3 may be arranged movable in the direction orthogonal to the center axis C of the liquid crystal panel 441. In this case, it is only required that the transmission area of the light beam irradiated from the end of the optical image formation area of the liquid crystal panel 441 and corresponding to the projection lens 3 is covered when the projection lens 3 is moved furthermost, and the center of the optical conversion area in the light irradiation plane of the polarization film 443B is positioned based on the maximum irradiation angle of that light beam in the liquid crystal panel 441.

In the above-described exemplary embodiment, although the projector 1 uses the three liquid crystal panels 441 (441R, 441G, 441B), the invention may be applied to a projector using one, two or more than three liquid crystal panels. Since a single-plate projector using one liquid crystal panel does not need a cross dichroic prism as a color-combining optical device, refraction of the light beam using the cross dichroic prism may not be considered, thus facilitating the position adjustment of the polarization film 443B of the irradiation-side polarization plate 443.

In the above-described exemplary embodiment, although a transmissive liquid crystal panel having different light-incident side and light-irradiation side is used, a reflective liquid crystal panel having common light-incident side and light-irradiation side may be used.

In the above-described exemplary embodiment, the liquid crystal panel is used as the optical modulator, an optical modulator using a micro mirror or the like other than a liquid crystal panel may be used.

In the above-described exemplary embodiment, although the optical unit 4 substantially has an L-shape in plan view, it may substantially have a U-shape in plan view for instance.

In the above exemplary embodiment, although a front-type projector that projects an image in a direction for observing a screen is taken as an example, the invention may be applied to a rear-type projector that projects an image in a direction opposite to the direction for observing the screen.

The invention is applicable to a projector including an optical modulator that modulates a light beam irradiated by a light source device in accordance with image information and forms an optical image, and a projection lens that projects the optical image formed by the optical modulator in an enlarged manner.

What is claimed is:

1. A projector, comprising:

a light source device;

an optical modulator arranged on an illumination optical axis of a light beam irradiated by the light source device to modulate the light beam in accordance with image information and form an optical image;

a projection lens that enlarges the optical image formed by the optical modulator and projects the optical image; and an optical converter arranged between the optical modulator and the projection lens and provided with an optical conversion area that optically converts the incident light beam, wherein the optical conversion area of the optical converter is formed in a profile on which substantially all of the light beams irradiated from the optical modulator to be irradiated from the projection lens as the optical image are incident, the optical modulator has a center axis passing through the center of an optical image formation area of the optical modulator and being parallel to the illumination optical axis, the projection lens is so arranged that a lens optical axis of the projection lens is deviated in parallel relative to the center axis of the optical modulator, and the center axis passing through the center of the optical conversion area and being parallel to the illumination optical axis is positioned within a range between: a plane orthogonal to a deviation direction of the lens optical axis of the projection lens relative to the center axis of the optical modulator and including the center axis of the optical modulator; and a plane orthogonal to the deviation direction and including the lens optical axis.

2. The projector according to claim 1, wherein the projection lens has a projection area that transmits the light beam irradiated from the optical modulator to be projected as the optical image, and when assuming that: an irradiation angle of the light beam passing through an end in the deviation direction of the projection area in a light incident plane of the projection lens from the optical modulator out of the light beams irradiated from the end in the deviation direction of the optical image formation area of the optical modulator is expressed as an angle $\theta_1$; an irradiation angle of the light beam passing through an end in a direction opposite to the deviation direction of the projection area in the light incident plane of the projection lens from the optical modulator out of the light beams irradiated from the end in the direction opposite to the deviation direction of the optical image formation area of the optical modulator is expressed as an angle $\theta_2$; and a distance from a light irradiation plane of the optical modulator to a light irradiation plane of the optical converter is expressed as a distance d, the center axis of the optical converter is arranged at a position deviated from the center axis of the optical modulator in the deviation direction only by a distance corresponding to a distance L obtained by an Equation (I).

$$L = d(\tan \theta_1 - \tan \theta_2)/2 \qquad \text{Equation (I)}$$

3. The projector according to claim 1, wherein the optical modulator is a polarization film or a polarization plate that transmits a linear polarized light in a predetermined direction out of the light beams irradiated from the optical modulator.

* * * * *